(12) United States Patent
Lombardo et al.

(10) Patent No.: US 10,624,320 B2
(45) Date of Patent: Apr. 21, 2020

(54) RIDER NOTIFICATION APPARATUS AND METHOD

(71) Applicant: Angular LLC, Chicago, IL (US)

(72) Inventors: Joseph Dominic Lombardo, Albuquerque, NM (US); Hilary Mary Clayton, Mason, MI (US)

(73) Assignee: Angular LLC, Chicago, IL (US)

( * ) Notice: Subject to any disclaimer, the term of this patent is extended or adjusted under 35 U.S.C. 154(b) by 216 days.

(21) Appl. No.: 15/679,392

(22) Filed: Aug. 17, 2017

(65) Prior Publication Data

US 2018/0055018 A1    Mar. 1, 2018

Related U.S. Application Data

(60) Provisional application No. 62/379,535, filed on Aug. 25, 2016.

(51) Int. Cl.
*A63B 69/00*    (2006.01)
*A01K 29/00*    (2006.01)
(Continued)

(52) U.S. Cl.
CPC ............ *A01K 29/005* (2013.01); *A01K 15/02* (2013.01); *A01K 15/027* (2013.01); *A63B 24/0062* (2013.01); *A63B 69/00* (2013.01); *B68B 5/00* (2013.01); *F21V 23/003* (2013.01); *F21V 23/02* (2013.01); *H05B 33/0845* (2013.01); *A63B 71/0622* (2013.01); *A63B 2024/0015* (2013.01);
(Continued)

(58) Field of Classification Search
USPC ....... 434/247, 255, 258, 260; 472/95, 97, 99
See application file for complete search history.

(56) References Cited

U.S. PATENT DOCUMENTS 4,774,679 A * 9/1988 Carlin .................. A61B 5/0002
273/454
4,935,887 A * 6/1990 Abdalah ................ A63B 24/00
702/141

(Continued)

FOREIGN PATENT DOCUMENTS

GB         2520806 A      6/2015
WO    2009030939 A2      3/2009

(Continued)

OTHER PUBLICATIONS

Eaton, Edie Jane, "Tension Patterns in Horses," http://www.listeningtowhispers.com/tensionPatterns.shtml, 8 pages (2016).

(Continued)

*Primary Examiner* — Kurt Fernstrom
(74) *Attorney, Agent, or Firm* — Fitch, Even, Tabin & Flannery LLP

(57) ABSTRACT

Disclosed are apparatuses and methods useful for providing a visual indication to the rider of a horse of one or more inputs, such as the pitch of the head of a horse. The apparatuses and methods are useful in connection with the sport of dressage. The rider can be notified of a position or orientation of the horse's head, of rein tension, of the rider's body position or orientation, of a current location within a course or routine, of a warning, or of other information. The visual indication can be in the form of an illuminated light source.

17 Claims, 7 Drawing Sheets

(51) Int. Cl.
| F21V 23/02 | (2006.01) |
| F21V 23/00 | (2015.01) |
| H05B 33/08 | (2020.01) |
| B68B 5/00 | (2006.01) |
| A01K 15/02 | (2006.01) |
| A63B 24/00 | (2006.01) |
| A63B 71/06 | (2006.01) |
| F21Y 115/10 | (2016.01) |

(52) U.S. Cl.
CPC ....... A63B 2207/02 (2013.01); A63B 2220/13 (2013.01); A63B 2220/16 (2013.01); A63B 2220/18 (2013.01); A63B 2220/40 (2013.01); A63B 2220/44 (2013.01); A63B 2220/62 (2013.01); A63B 2225/20 (2013.01); A63B 2244/24 (2013.01); F21Y 2115/10 (2016.08)

(56) References Cited

U.S. PATENT DOCUMENTS

| 4,988,300 | A | * | 1/1991 | Yamaguchi | A63B 69/04 280/1.201 |
| 5,138,550 | A | * | 8/1992 | Abraham | A01K 15/02 119/702 |
| 5,519,986 | A | | 5/1996 | Raffit | |
| 5,722,352 | A | | 3/1998 | Leatherman | |
| 6,059,666 | A | | 5/2000 | Ohara et al. | |
| 6,081,607 | A | | 6/2000 | Mori et al. | |
| 6,659,960 | B2 | | 12/2003 | Derksen et al. | |
| 6,808,458 | B1 | * | 10/2004 | Jung | A63B 69/04 434/247 |
| 6,952,912 | B2 | | 10/2005 | Lambert | |
| 7,171,797 | B2 | | 2/2007 | Brehm | |
| 7,175,440 | B1 | | 2/2007 | Bateman | |
| 7,335,168 | B2 | | 2/2008 | Rugg | |
| 7,467,603 | B2 | * | 12/2008 | Davies | A01K 11/008 119/712 |
| 7,601,126 | B2 | | 10/2009 | Keegan et al. | |
| 8,398,560 | B2 | * | 3/2013 | Elser | A61B 5/0059 600/534 |
| 8,955,461 | B2 | | 2/2015 | Lloyd | |
| 8,979,757 | B2 | | 3/2015 | Mottram et al. | |
| 9,104,906 | B2 | | 8/2015 | McVey | |
| 9,159,245 | B2 | * | 10/2015 | Smith | G09B 19/0038 |
| 9,317,743 | B2 | | 4/2016 | Datta et al. | |
| 9,355,307 | B2 | * | 5/2016 | Bradley | A01K 11/008 |
| 2002/0046713 | A1 | | 4/2002 | Otto | |
| 2004/0110116 | A1 | * | 6/2004 | Pretty | A63B 69/04 434/247 |
| 2010/0302004 | A1 | | 12/2010 | Winstead et al. | |
| 2013/0211773 | A1 | | 8/2013 | Loeschinger | |
| 2014/0093851 | A1 | * | 4/2014 | Kim | A61B 5/1116 434/247 |
| 2014/0130465 | A1 | | 5/2014 | Rodriguez | |
| 2014/0350410 | A1 | | 11/2014 | Axelsson et al. | |
| 2014/0373793 | A1 | | 12/2014 | McDermott et al. | |
| 2015/0237834 | A1 | | 8/2015 | Schab et al. | |
| 2016/0030827 | A1 | * | 2/2016 | Greenwood | A63B 69/04 434/247 |
| 2016/0058379 | A1 | | 3/2016 | Menkes et al. | |
| 2016/0100802 | A1 | | 4/2016 | Newman | |
| 2016/0114233 | A1 | * | 4/2016 | Marsh | G01L 5/225 434/247 |
| 2016/0165852 | A1 | | 6/2016 | Goldfain | |

FOREIGN PATENT DOCUMENTS

| WO | 2014207050 A1 | 12/2014 |
| WO | 2015193327 A1 | 12/2015 |
| WO | 2016097746 A1 | 6/2016 |

OTHER PUBLICATIONS

Christiansen et al., "Effects of hyperflexion on acute stress responses in ridden dressage in horses," http://www.sciencedirect.com/science/article/pii/S0031938414000419, 7 pages (2014).
Munz et al., "Horse-rider interaction in dressage riding," http://www.sciencedirect.com/science/article/pii/S0167945713001486, 11 pages (2014).
Eiserio et al., "Movements of the horse's mouth in relation to horse-rider kinematic variables," http://www.sciencedirect.com/science/article/pii/S1090023313004589, 6 pages (2013).
Greve et al., "The horse-saddle-rider interaction," http://www.sciencedirect.com/science/article/pii/S1090023312004558, 7 pages (2013).
Rhodin et al., "Effect of lungeing on head and pelvic movement asymmetry in horses with induced lameness," http://www.sciencedirect.com/science/article/pii/S1090023313004590, 7 pages (2013).
Sleutjens, Janneke; "The effect of the head and neck position on the equine athlete," http://dspace.library.uu.nl/bitstream/handle/1874/280976/sleutjens.pdf?sequence=2, 128 pages (2013).
Peacock, Luke B., "The Equine Distress Monitor Project," http://www.ece.usu.edu/grad/reports_theses_disseratations/2011/Peacock_luke_B/report.pdf, 91 pages (2012).
McGreevy et al., "Over-flexing the horse's neck: A modern equestrian obsession?," http://www.sciencedirect.com/science/article/pii/S1558787810000602, 7 pages (2010).
International Society for Equitation Science, "ISES position statement on alterations of the horses' head and neck posture in equitation," 14 pages (2015).

* cited by examiner

RIDER NOTIFICATION APPARATUS AND METHOD

CROSS-REFERENCE TO RELATED APPLICATION

This application claims the benefit of U.S. Provisional Application No. 62/379,535, filed Aug. 25, 2016, which is hereby incorporated herein by reference in its entirety.

TECHNICAL FIELD

This invention relates generally to position indication. Some embodiments are in the field of horse riding, and, more particularly, in the field of monitoring the performance of a horse when riding the horse.

BACKGROUND

In dressage competitions, horse and rider teams perform a formalized sequence of specific movements. For many movements, it can be important to maintain the horse's head at a specific angle, such as pitch, yaw, and/or roll. The angle of the horse's head, however, can be difficult for the rider to observe while riding the horse.

It has now been found that an apparatus for providing information concerning the position of the head of a horse to the rider may be provided. A position indication apparatus may comprise a housing configured to be secured to the head of the horse, a first light source oriented to be visible to a rider of the horse when so secured, a power source and control circuit disposed within the housing, and a pitch determination device disposed within the housing for determination of a pitch of the head of the horse. The control circuit may be configured to compare the measured pitch of the head of the horse relative to a predetermined or rider-defined ideal pitch and to illuminate the light source using one of the plurality of illumination options to thereby provide pitch information to the rider. The illumination may vary over a spectrum between predetermined minimum and maximum pitches of the horse's head.

The illumination options may include a plurality of colors that correspond to ranges of pitches relative to the ideal pitch. For example, the illumination device may display a green light when the head of the horse is at an ideal pitch. This green light may change over a spectrum of colors to a red light when the pitch of the head of the horse is at a predetermined maximum or may change over a different spectrum of colors to a blue light when the head of the horse is at a predetermined minimum. The device may be configured to receive a secondary input from a secondary measurement device, such as a device that measures yaw or roll; a rein tension measurement device; or a device mounted to the rider of the horse. In alternative embodiments, the primary measurement device may be a device for measuring one of the above aspects of the horse or rider's position, and pitch measurement may be an optional secondary feature.

Also encompassed in various aspects of the disclosed invention are a method for receiving illumination information and a system. The inventive method generally comprises use of the position indication apparatus in accordance with its intended purpose. The inventive system generally comprises the apparatus in connection with a second device, for example, another sensor affixed to the horse or rider. The system alternatively or additionally may include a remote device that communicates with and/or receives communications from the apparatus. For example, the remote device may be configured to send a warning signal to the apparatus, whereby the apparatus is configured to provide warning information to the rider. Such system is used for providing a warning indication to the rider; for example, if an unforeseen horse hazard arises during a dressage competition, a judge may use the remote device to send a warning signal to the rider. The third party device may include a receiver for receiving information from the apparatus, such as horse head pitch data or color information for a display similar to the display that is visible to the rider.

DETAILED DESCRIPTION

Figure 1:
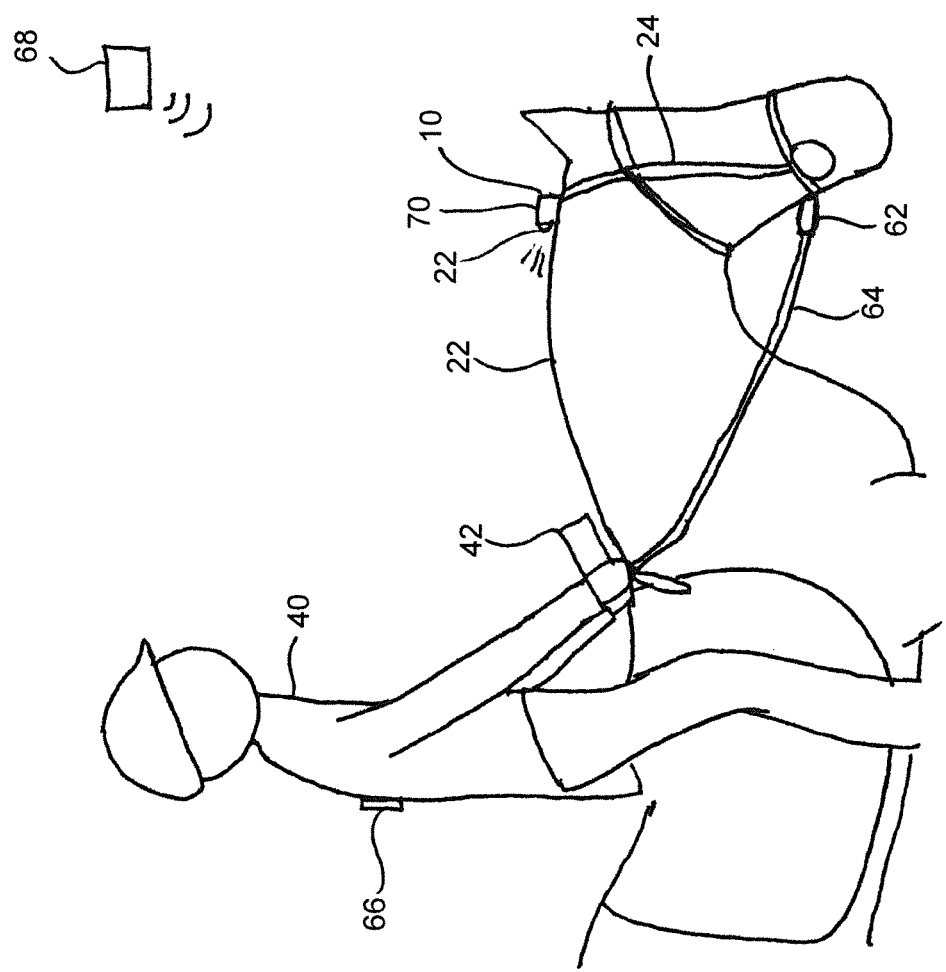
FIG. 1 is a perspective view of a horse and rider with an exemplary position indication apparatus mounted thereto.

Generally speaking, pursuant to various embodiments, systems, apparatuses and methods are provided herein useful to provide a visual indication to the rider of a horse of various inputs. For example, the rider can be notified of a position or orientation of the horse's head, of rein tension, of the rider's body position or orientation, of a current location within a course or routine or other course information, of a warning, and so forth. The visual indication can be in the form of an illuminated light source, such as a light emitting diode (LED), or, more preferably, an array of LEDs that can transition between different colors, blink, turn on and off, and so forth.

An exemplary notification apparatus 10 is shown in FIGS. 1-4. As illustrated, the apparatus 10 includes a housing 12, which can have any desired shape. The housing 12 includes an interior 14 for housing an electronic assembly 16. The housing 12 further includes a through opening 18 extending from an exterior surface 20 thereof to the interior 14. The housing 12 is configured to mount or be secured to a horse 22 using any desired securing mechanism, such as hook and loop fasteners, a clamping mechanism, adhesive, fasteners, straps, buckles, and so forth. The housing 12 can secure to a bridle 24, a separate strap, or directly to the horse's head.

Figure 3:
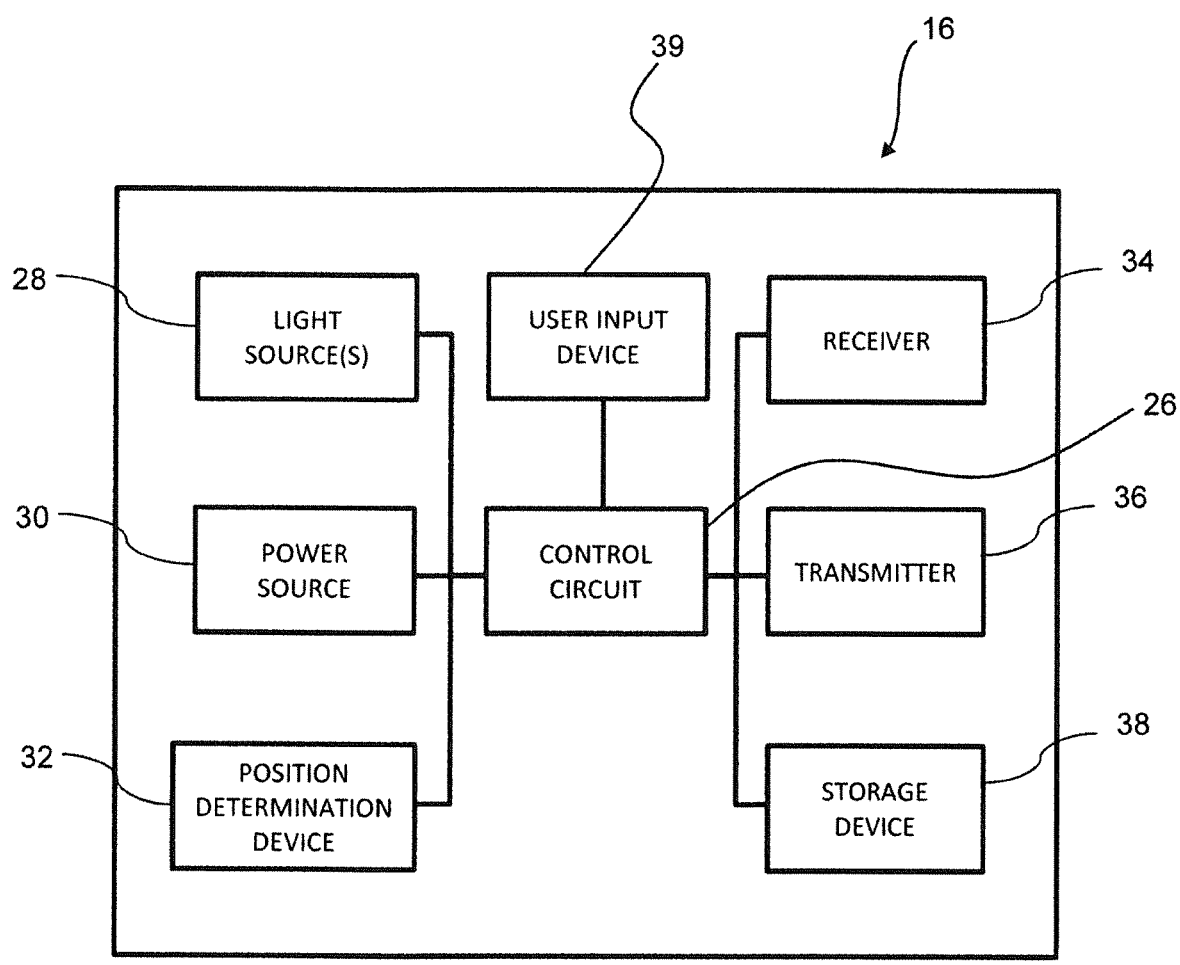
FIG. 3 is a diagrammatic view of the position indication apparatus shown in FIGS. 1 and 2.

As shown in FIG. 3, the electronic assembly 16 can include a control circuit 26, one or more light sources 28, a power source 30 to provide power to the electronic assembly 16, which can be rechargeable or replaceable as desired, a position determination device 32, which can be one or more MEMS sensors, including accelerometers, inclinometers, compasses, gyroscopes, or the like, some or all of which optionally integrated into an inertial memory unit (IMU). The assembly may further include a receiver 34, a transmitter 36, and a storage device 38, which can be local within the housing 12 or remote. The electronic assembly 16 can further include an optional user input 39 for a user to operate the apparatus 10. Alternatively, the apparatus 10 can be controlled by a remote computing device, as described below.

Figure 2:
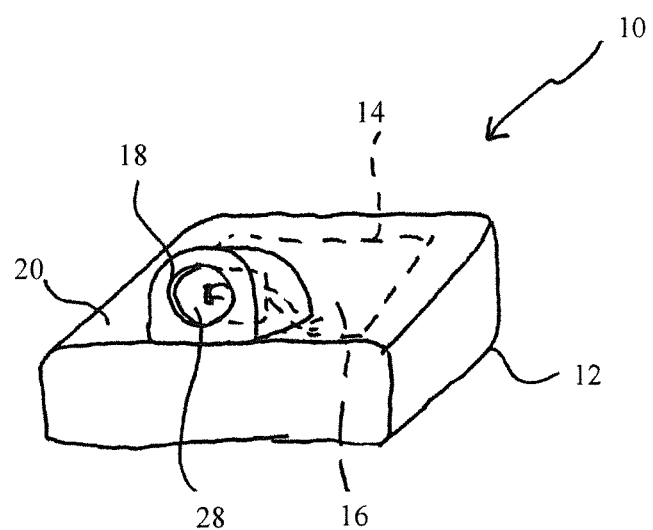
FIG. 2 is a perspective view of the position indication apparatus shown in FIG. 1.

The housing 12 can be sized to receive all the components of the electronic assembly 16 therein with the components coupled to one another using electrical connections, such as traces, wires, etc. and/or in communication with one other over wired or wireless connections. The receiver 34 and transmitter 36 can be combined into a transceiver and can be configured to operate over any desired network, including the Internet, radio, Bluetooth, near field communication, and the like. Further, as shown in FIGS. 1 and 2, the light source 28 may be mounted within the through opening 18 to be visible to a rider 40 of the horse 22. The light source may be otherwise configured or disposed relative to the housing of the apparatus.

Figure 4:
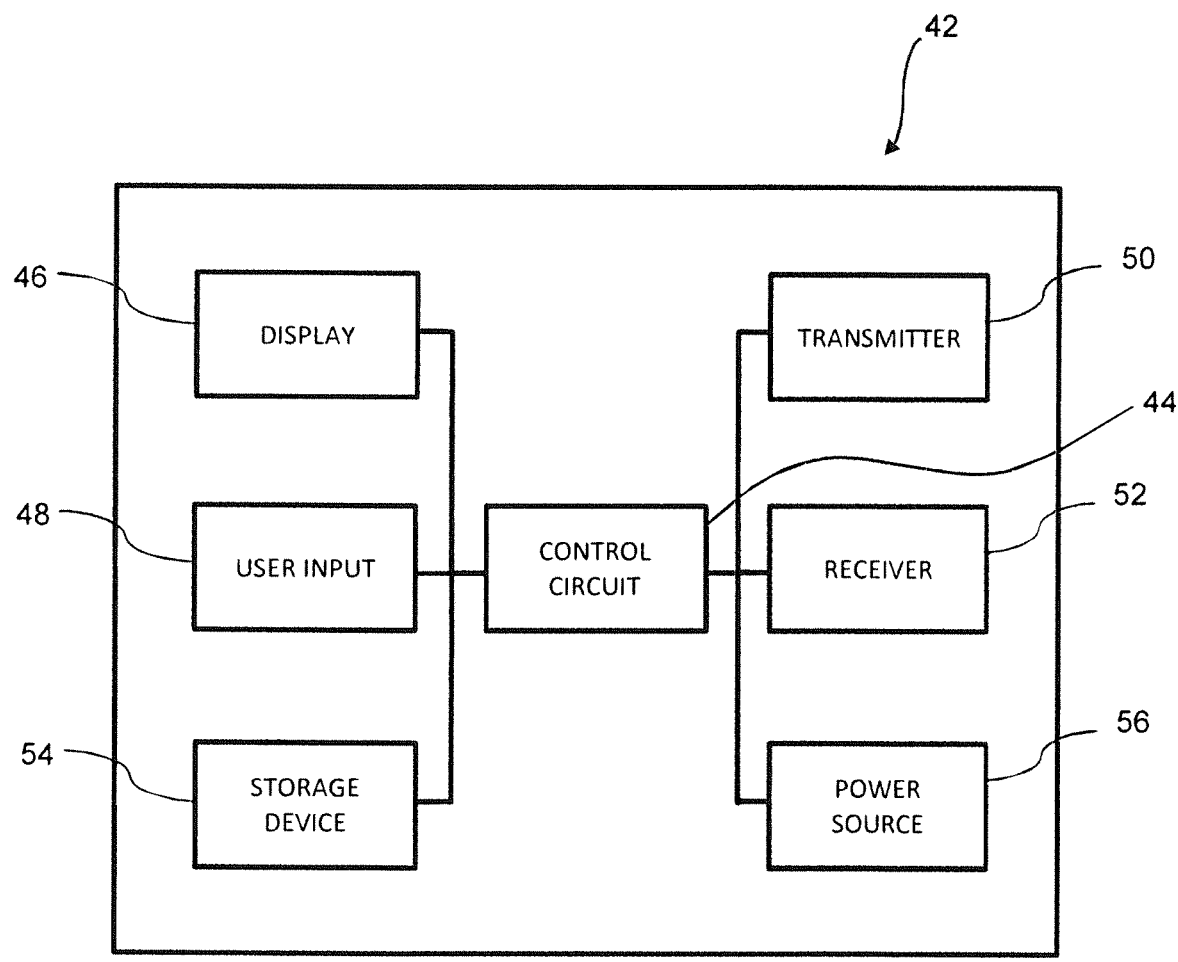
FIG. 4 is a diagrammatic view of a computing device useful in connection with the illustrated position indication apparatus.
Figure 5:
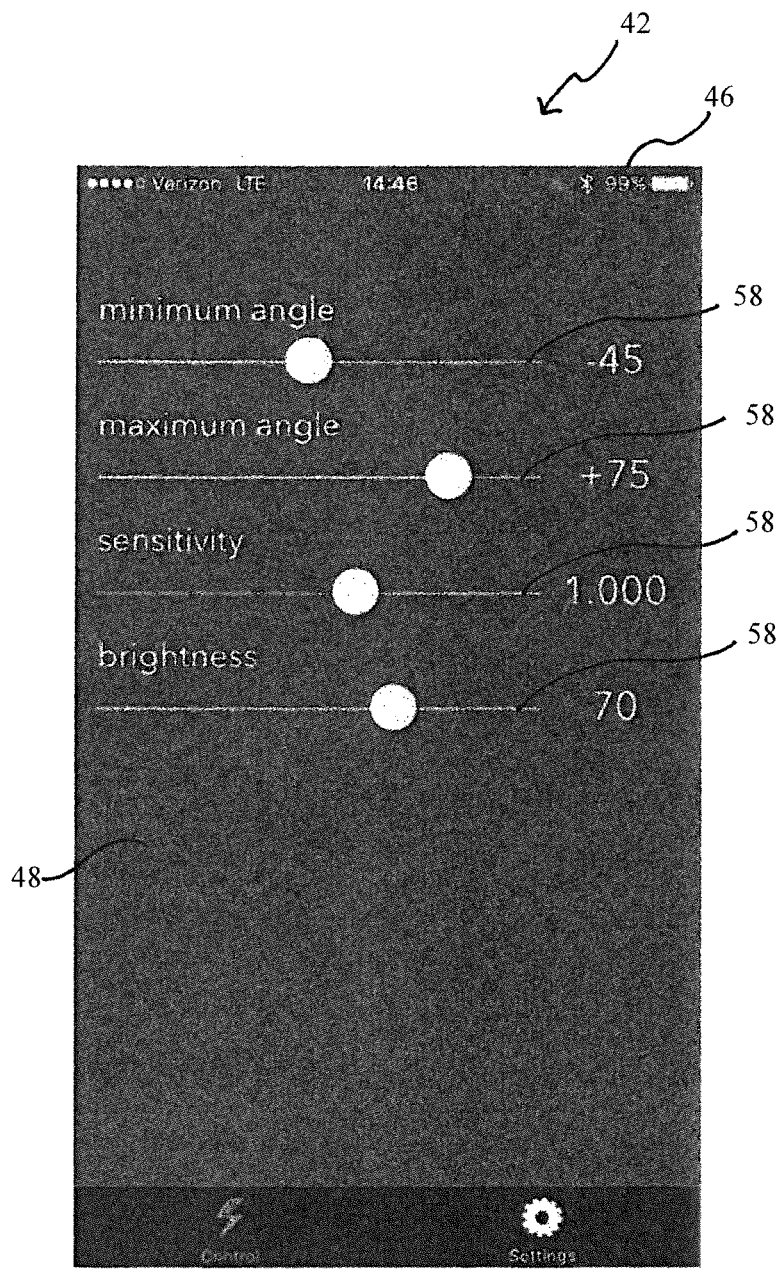
FIG. 5 is a plan view of a display of an exemplary mobile communication device showing user controls.

As shown in FIGS. 4 and 5, the electronic assembly 16 can be controlled at least in part by an application or other software operating on a computing device 42, such as a mobile telephone, tablet, laptop, or other computing device. The computing device 42 can include a control circuit 44, a display 46, a user input 48, which can be a touch screen, buttons, switches, and so forth, a transmitter 50, a receiver 52, a storage device 54, and a power source 56.

The term control circuit refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. The control circuits 26, 44 may be configured (for example, by using corresponding programming stored in a memory as will be well understood by those skilled in the art) to carry out one or more of the steps, actions, and/or functions described herein.

Software operating on the computing device 42 can provide the various functionalities and operations described herein. Computing device 42 can be a mobile communication device and the software can be in the form of an application running on the mobile communication device. The application can be available for purchase and/or download from any website, online store, or vendor over any suitable communication network, including the Internet, radio communication, Bluetooth, near field communication, etc. Alternatively, a user can download the application onto a personal computer and transfer the application to the mobile communication device 42. In this instance, the user downloads and installs the app on the mobile communication device 42. When operation is desired, the user runs the application on the mobile communication device 42 by a suitable selection.

As set forth above, the position determination device 32 can be configured to measure a variety of orientations or positions of the head of the horse 22. For example, the position determination device 32 can measure the pitch of the head of the horse 22, the yaw of the head of the horse 22, and/or the roll of the head of the horse 22. By a further approach, the rider 40 can set a plane corresponding to the horse's head being in a desired position, such as by selection or actuation of a tare user input, as described in more detail below, and subsequent measurements can be compared to the preset plane and the ideal pitch position. Upon input of the tare user input, the control circuit 26 can store the readings of the position determination device 32 in the storage device 38. So configured, the position determination device 32 will monitor the position of the horse's head with regard to the desired orientations, i.e., pitch, yaw, roll, and send the measurements to the control circuit 26. The control circuit 26 can then compare the current measurements to the preset plane. The tare procedure may involve depressing a button, such as the user input 39 of the apparatus 10, or may comprise use of a remote communications device.

Further, the control circuit 26 can receive or retrieve maximum and minimum orientations for the desired measurements. In the pitch example, the maximum orientation can refer to the horse's head tilted upward and the minimum orientation can refer to the horse's head tilted downward. In the yaw example, the maximum orientation can refer to the horse's head looking right and the minimum orientation can refer to the horse's head looking left. In the roll example, the maximum orientation can refer to horse's head tilted to the right and the minimum orientation can refer to the horse's head tilted to the left. The maximum and minimum examples used herein can also refer to the opposite measurement.

By one approach, a user can set the maximum and minimum orientations for any of the desired measurements using the mobile communication device 42, by which is contemplated the positions of the horse's head at which the device will register a minimum or maximum reading. An exemplary display screen is shown in FIG. 5. As shown, the user can utilize the touch screen 48 to operate sliding scales 58 to set the orientations. By other approaches, the user can enter numbers or the like. The control circuit 26 of the electronic assembly 16 can then store the maximum and minimum orientations corresponding to maximum and minimum determined pitches in the storage device 38. Advantageously, being able to configure and adjust the maximum and minimum orientations can be utilized to maximize training for different experience levels. For example, the maximum and minimum can be set relatively far from one another at the start and narrowed as skills increase.

So configured, the control circuit 26 can compare the current measurements from the position determination device 32 to the maximum and minimum orientations. To provide an indication of the current measurements relative to the maximum and minimum orientations, the control circuit 26 can illuminate the light source 28 with one of a variety of illumination options. By one approach, if the current measurement falls between the maximum and minimum orientations, the light source 28 can be one color, above the maximum a second color, and below the minimum the second color or a third color. So configured, the rider 40 will be able to easily determine, using the color of the light source 28, whether the horse's head has the correct orientation. It is contemplated that the data may optionally be time-stamped and stored, or optionally transmitted to a remote device for viewing by a trainer or competition judge.

By another approach, transitions between the colors can have gradation, such that the rider will be able to notice subtle changes in color during use. The gradation can be set, for example, using the sliding scale 58 for sensitivity shown in FIG. 4. By yet another approach, the light source 28 can be configured to illuminate or flash when the horse's head rises above the maximum or falls below the minimum. Further, although two or three color options were described, any number of colors within the spectrum can be utilized to provide a rider with information as to the position of the horse's head. As such, the rider 40 will be informed as to the position of the horse's head and take any necessary corrective action. Additionally, as shown in FIG. 4, the user can adjust the brightness of the light source 28 using the sliding scale 58.

If desired, the control circuit 26 can be configured to store readings from the position determination device 32 on the storage device 38. As such, the rider 40 will be able to access the readings and analyze the performance to better correct any errors after the fact.

As shown in FIG. 1, the indication apparatus 10 can also be configured to receive additional inputs from one or more secondary devices. In a first example, the apparatus 10, and the position determination device 32 thereof, can be configured to monitor the yaw and/or roll of the horse's head in addition to the pitch thereof. In a second example, the apparatus 10 can include one or more of the below devices, which can operate in conjunction with the position determination device 32. The mobile communication device 42 can be utilized to set and adjust the settings of the various secondary devices, where applicable.

In one approach, the user can select one of the multiple inputs for monitoring and illumination of the light source 28. In another approach, the housing 12 can include a plurality of light sources 28 mounted therein, and each input can have an associated light source output for providing information to the rider.

In some embodiments, the secondary device can be a rein tension measurement device 62 mounted to the reins 64 of the bridle 24. So configured, the control circuit 26 can receive current measurements from the device 62, receive maximum and/or minimum measurements, such as from the mobile communication device 42 as described above, and compare the current measurements to the maximum and/or minimum. The control circuit 26 can then illuminate the light source 28, which can be configured as described above, to inform the rider of the current rein tension.

In some embodiments, the secondary device can be a rider position measurement device 66, configured similarly to the position determination device 32 described above, that is configured to be mounted or secured to the rider 40 for measurement of a rider attribute. For example, the device 66 can be mounted to the head, torso, feet, or legs of the rider 40 to provide an indication of posture and/or orientation. So configured, the control circuit 26 can receive current measurements from the device 66, receive maximum and/or minimum orientations, such as from the mobile communication device 42 as described above, and compare the current measurements to the maximum and/or minimum. The control circuit 26 can then illuminate the light source 28, which can be configured as described above, to inform the rider of the current orientations.

In some embodiments, as associated system may comprise a third party communication device 68 that is configured to send a warning signal to the control circuit 26 via the receiver 34. For example, if judges or other third parties watching a performance notice a hazard or other situation that the rider 40 should be notified of, the third party can operate the third party device 68 to send a warning signal to the control circuit 26, which can then illuminate the light source 28 to notify the rider 40 of the issue. The third party communication device 69 can cause the light source 28 to flash red, for example.

In some embodiments, the secondary device can be a location determination device 70, using global positioning circuitry or the like, that is configured to determine a location of the horse 22 and rider 40. In some performances or routines, the rider 40 will attempt to lead the horse 22 along a specific route doing specific actions. The control circuit 26 can be configured to retrieve course and/or action information from the storage device 38 and compare the current location with the stored information. The control circuit 26 can then illuminate the light source 28 to provide an indication to the rider 40 of a next step or a current location.

In some embodiments, the secondary device can be an addition sensor affixed to the horse or rider. For example, it is contemplated that the secondary device can be a horse pulse sensor. The secondary device may be a gait attribute sensor, such as a sensor affixed to one or more hooves of the horse.

With regard to the output, numerous modes of operation for the color output are contemplated. In some embodiments, the device may be configured to operate in one of multiple modes depending on the selection of the mode of operation by the user. For example, the apparatus may be operated in a continuous spectrum mode of operation, a discrete spectrum mode of operation, or a center zone mode of operation, among other possible operating modes. It is contemplated that the output can comprise one display for each attribute measured by the apparatus or that some aspects of the measured attributes can be consolidated.

Figure 6:
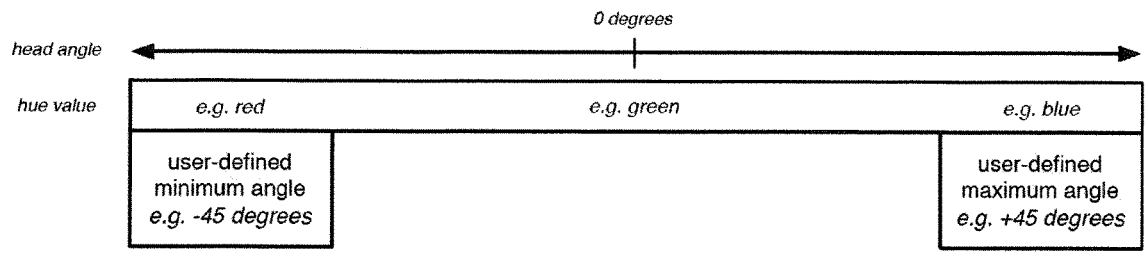
FIG. 6 is a representation of a color spectrum output based on a continuous spectrum mode of operation.

With reference to FIG. 6, in a continuous spectrum mode of operation, as the current head angle changes, the output hue value changes along as close to a continuous spectrum as can be achieved via the light output device. The control circuit first creates an angle scale by calculating the difference between the user-defined minimum angle and the user-defined maximum angle, then creates a hue scale bounded by a minimum hue value and a maximum hue value, then maps the current head angle to the hue scale proportionally to create an output hue value.

Figure 7:
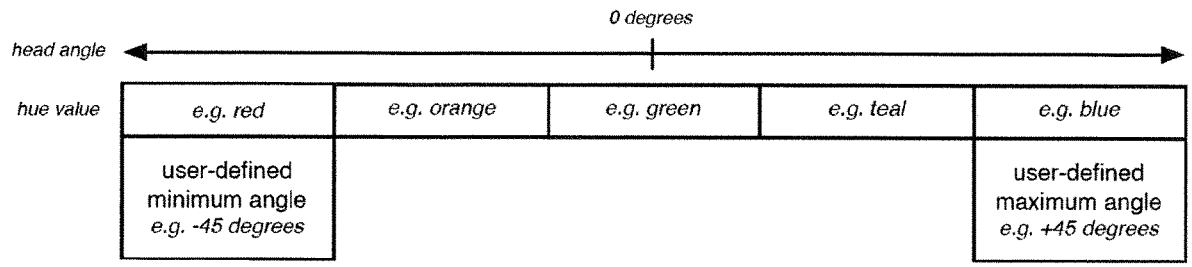
FIG. 7 is a representation of a color spectrum output based on a discrete spectrum mode of operation.

With reference to FIG. 7, in a discrete spectrum mode of operation, the control circuit first creates an angle scale by calculating the difference between the user-defined minimum angle and the user-defined maximum angle, then proportionally scales a set of discrete predefined ranges to fit the angle scale. The control circuit then assigns the current head angle into one of the discrete ranges to create an output hue value. As the current head angle changes, the output hue value changes along a discrete spectrum. For example, all angle measurements between the minimum and maximum pitch angles (say, −20 and +20 degrees) may be assigned the same hue value, which corresponds to the color green. In some embodiments, the number of ranges and the colors assigned to them may be defined by the user. The number of ranges may be asymmetrical, for example, the user may choose to have more ranges on the positive side of the scale, and fewer ranges or buckets on the negative side of the scale.

Figure 8:
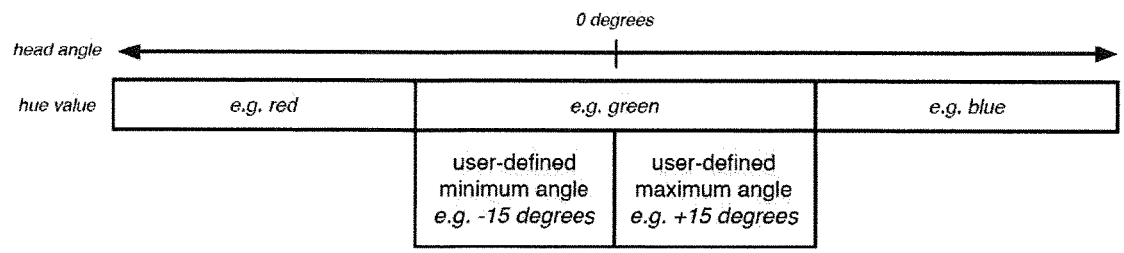
FIG. 8 is a representation of a color spectrum output based on a center zone mode of operation.

With reference to FIG. 8, in the center zone mode of operation, the control circuit assigns hue values based on a central zone bounded by a user-defined minimum angle and a user-defined maximum angle. Head angle measurements less than the user-defined minimum angle are assigned a minimum hue value, head angle measurements between the user-defined minimum angle and the user-defined maximum angle are assigned a center hue value, and head angle measurements greater than the user-defined minimum angle are assigned a maximum hue value. The user may define the minimum, center, and maximum hue values.

Figure 9:
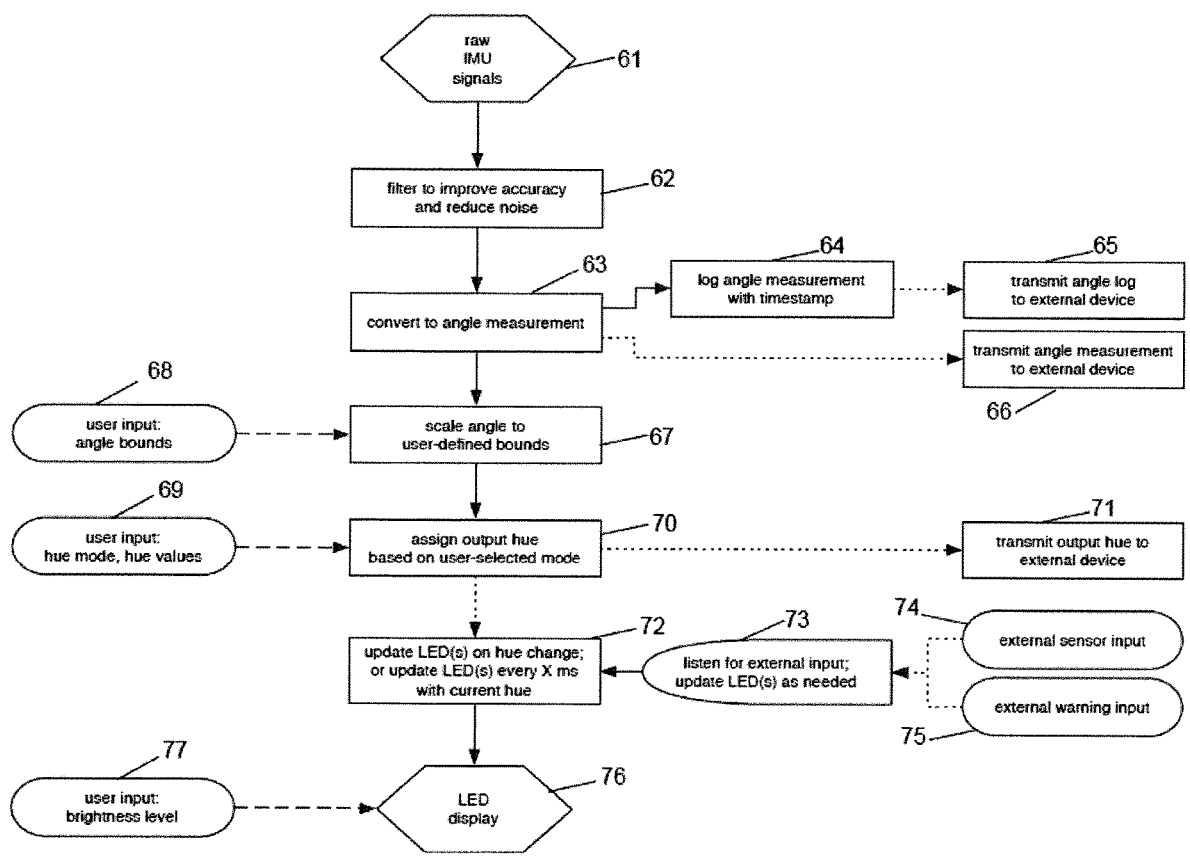
FIG. 9 is a diagram representing logic for the control circuit.

With reference now to FIG. 9 and the control logic generally depicted therein, at step 61, raw signals from the IMU are received. As heretofore described, these signals may include signals corresponding to accelerometer data, GPS data, compass data, or other information. If a gyroscope is included and if a gyroscopically generated signal is generated, this information also may be included in the IMU signals. At step 62, a filter, such as a low-pass or Kalman filter, may be applied to the signal to approve signal accuracy and reduce noise. At step 63, the signal may be converted to useful information corresponding to a desired output. In the illustrative embodiment, step 63 represents conversion to the pitch angle of the head of the horse, although in other embodiments an alternative parameter may be evaluated. Optionally, as shown in steps 64 and 65, the angle may be logged with a timestamp and transmitted to an external device, or, as depicted in step 66, the angle itself may be transmitted without a timestamp to an external device. The external device may be a remote device and the mode of transmission may be via electronic signal such as a radio signal. Via this approach, a trainer or competition judge may view data from the apparatus.

Returning to step 67, upon determination of the angle measurement, the angle is scaled to the user-defined bounds. By this is contemplated that a scale ranges between the user defined minimum and maximum, as input via step 68, as devised. For example, if the user defined minimum and maximum pitches are respectively 30 degrees in either direction, any measured angle greater than 30 degrees will be recorded as a minimum or maximum angle. Angles between 0 and 30 degrees in one direction and 0 and 30 degrees in the other direction are scaled to a value between −30 and +30, and, in step 70, an output hue is assigned. The output hue may be assigned in part based on the user-selected mode, as input via steps 69. As shown at step 71, an optional feature of the invention is transmission of this output hue or data corresponding thereto to an external device, again such as a remote device operated by a trainer or judge. At step 72, the illumination device, in this case an LED, or array of colored LEDs, is updated based on the change of hue. Optionally the LED array may be updated periodically, every X milliseconds or X ranges from 1-1,000 with the current hue information.

As shown in steps 73-75, an external sensor or warning input may be provided and, in step 73, the process may be interrupted to display external information. For example, if a judge detects an unanticipated course hazard, the judge may send a warning signal to the apparatus. It is contemplated that the device may be equipped with a speaker and a circuit for generating an audible warning signal.

Step 76 in the process flow represents the actual LED display, as updated by the hue information and, in steps 77, it is seen that the use optionally may be able to adjust the brightness level of the LED.

It is now seen that a position indication apparatus and method and associated systems are provided. These are useful in the sport of dressage and are more generally useful in the evaluation of horse movement. It is contemplated that the apparatus, method, and systems are useful for evaluating motion of other animals, including humans.

Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A position indication apparatus comprising:
   a housing configured to be secured to a head of a horse;
   a first light source oriented to be visible to a rider of the horse when so secured;
   a power source disposed within the housing and coupled to the first light source to provide power thereto;
   a pitch determination device disposed within the housing for determination of a pitch of the head of the horse;
   a control circuit disposed within the housing and coupled to the position determination device and the first light source, the control circuit configured to illuminate the first light source using an illuminated light source to thereby provide pitch information to the rider;
   wherein the position indication apparatus is secured to the head of a horse and is configured to receive illumination information from said illuminated light source relating to the pitch of the head of the horse;
   wherein the position indication apparatus is configured such that a rider can set a plane corresponding to the horse's head being in a desired position, to which subsequent measurements of the position of the head of the horse can be compared.

2. A system comprising:
   the position indication apparatus of claim 1; and
   a remote third-party device configured to communicate with the apparatus while the horse is being ridden.

3. A system according to claim 2, the remove remote third-party device being configured to send a warning signal to a receiver that is operatively connected to said control circuit, said control circuit being configured to provide warning information to the rider.

4. The system of claim 3, wherein said control circuit is configured to illuminate the first light source to thereby provide said warning signal.

5. The position indication apparatus of claim 1, wherein said illuminated light source comprises an array of light emitting diodes, wherein said light emitting diodes are configured to change colors based on a position of the head of the horse.

6. A position indication apparatus comprising:
   a housing configured to be secured to a head of a horse;

a first light source oriented to be visible to a rider of the horse when so secured;

a power source disposed within the housing and coupled to the first light source to provide power thereto;

a pitch determination device disposed within the housing for determination of a pitch of the head of the horse;

a control circuit disposed within the housing and coupled to the position determination device and the first light source, the control circuit configured to illuminate the first light source using an illuminated light source to thereby provide pitch information to the rider;

wherein a predetermined ideal pitch can be set by the rider.

7. The position indication apparatus of claim 6, wherein said illuminated light source comprises an array of light emitting diodes, wherein said light emitting diodes are configured to change colors based on a position of the head of the horse.

8. A position indication apparatus comprising:

a housing configured to be secured to a head of a horse;

a first light source oriented to be visible to a rider of the horse when so secured;

a power source disposed within the housing and coupled to the first light source to provide power thereto;

a pitch determination device disposed within the housing for determination of a pitch of the head of the horse;

a control circuit disposed within the housing and coupled to the position determination device and the first light source, the control circuit configured to illuminate the first light source using an illuminated light source to thereby provide pitch information to the rider;

wherein the illuminated light source includes a plurality of colors corresponding to ranges of pitches between a predetermined maximum and minimum pitch.

9. The position indication apparatus of claim 8, wherein the light source provides gradation with change in determined pitch.

10. A position indication apparatus comprising:

a housing configured to be secured to a head of a horse;

a first light source oriented to be visible to a rider of the horse when so secured;

a power source disposed within the housing and coupled to the first light source to provide power thereto;

a pitch determination device disposed within the housing for determination of a pitch of the head of the horse;

a control circuit disposed within the housing and coupled to the position determination device and the first light source, the control circuit configured to illuminate the first light source using an illuminated light source to thereby provide pitch information to the rider;

further comprising a receiver in communication with the control circuit, and permitting maximum and minimum determined pitches to be adjusted via a signal sent to the receiver via a remote device.

11. The position indication apparatus of claim 10, the control circuit is further configured to receive a secondary input from a secondary device and to provide an indication regarding the secondary input to the rider.

12. The position indication apparatus of claim 11, the control circuit configured to receive a secondary input from a device configured to determine a yaw or roll.

13. The position indication apparatus of claim 11, the control circuit configured to receive a secondary input from a rein tension measurement device.

14. The position indication apparatus of claim 11, the control circuit configured to receive a secondary input from a device mounted to the rider for measurement of a rider attribute.

15. The position indication apparatus of claim 11, the control circuit configured to receive a secondary input from a location device configured to determine a location of the horse; the control circuit being further configured to provide course information to the rider based on the location of the horse.

16. The position indication apparatus of claim 11, the control circuit configured to receive a secondary input from a secondary device mounted to the horse for measurement of a horse attribute.

17. The position indication apparatus of claim 11, comprising a second light source, and the control circuit is configured to illuminate one of the light sources to indicate the pitch relative to the maximum and minimum pitches to the rider and illuminate the other of the light sources to provide an indication regarding the secondary input to the rider.

* * * * *